United States Patent
Banholzer et al.

(10) Patent No.: US 6,935,179 B2
(45) Date of Patent: Aug. 30, 2005

(54) PRESSURE MEASURING ARRANGEMENT

(75) Inventors: Karl-Heinz Banholzer, Hausen (DE); Karl Flögel, Schopfheim (DE); Frank Hegner, Lörrach (DE); Bernd Rosskopf, Schopfheim (DE)

(73) Assignee: Endress + Hauser GmbH + Co. KG, Maulberg (DE)

( * ) Notice: Subject to any disclaimer, the term of this patent is extended or adjusted under 35 U.S.C. 154(b) by 19 days.

(21) Appl. No.: 10/399,399

(22) PCT Filed: Sep. 15, 2001

(86) PCT No.: PCT/EP01/10686

§ 371 (c)(1),
(2), (4) Date: Aug. 29, 2003

(87) PCT Pub. No.: WO02/33373

PCT Pub. Date: Apr. 25, 2002

(65) Prior Publication Data

US 2004/0040383 A1 Mar. 4, 2004

(30) Foreign Application Priority Data

Oct. 19, 2000 (DE) .......................................... 100 52 079

(51) Int. Cl.[7] .............................................. G01L 19/08
(52) U.S. Cl. ........................................... 73/712; 73/700
(58) Field of Search .................................... 73/700–712

(56) References Cited

U.S. PATENT DOCUMENTS

| | | | |
|---|---|---|---|
| 1,860,759 A | | 5/1932 | Winton |
| 2,078,623 A | * | 4/1937 | Wilde, Jr. ...................... 73/712 |
| 2,265,098 A | * | 12/1941 | Bettis ............................ 73/712 |
| 2,711,649 A | * | 6/1955 | Baker ............................ 73/712 |
| 3,064,479 A | * | 11/1962 | O'Brien et al. ................ 73/712 |
| 3,454,955 A | * | 7/1969 | Crist ............................. 73/712 |
| 3,707,000 A | * | 12/1972 | Anderson ...................... 73/712 |
| 3,780,574 A | * | 12/1973 | Miller ........................... 73/712 |
| 3,808,601 A | * | 4/1974 | Kolb et al. .................... 73/712 |
| 4,085,611 A | * | 4/1978 | Schwartz ....................... 73/115 |
| 4,414,851 A | | 11/1983 | Maglic |
| 4,833,922 A | | 5/1989 | Frick et al. |
| 5,212,989 A | | 5/1993 | Kodama et al. |
| 5,524,492 A | | 6/1996 | Frick et al. |

FOREIGN PATENT DOCUMENTS

| | | |
|---|---|---|
| DE | 3067088 | 5/1987 |
| DE | 4025539 | 2/1992 |
| DE | 19511063 | 11/1995 |
| DE | 19801051 | 4/2000 |
| WO | WO 95/28623 | 10/1995 |
| WO | WO 96 27 124 A1 | 9/1996 |

* cited by examiner

*Primary Examiner*—William Oen
*Assistant Examiner*—Alandra Ellington
(74) *Attorney, Agent, or Firm*—Bacon & Thomas

(57) ABSTRACT

The invention relates to a pressure measuring arrangement comprising a pressure measuring cell which is fed by a pressure corresponding to the pressure which is to be measured by a pressure tube filled by a pressurised liquid; at least one pressure recording unit is arranged separately from said cell, said unit being impinged upon by a pressure which is to be measured during operation, producing a pressure corresponding to the pressure which is to be measured via a pressure line filled by a liquid; a connection between the pressure tube and the pressure line. A modular design and a large amount of flexibility is obtained in respect of the spatial arrangement of the pressure measuring cell and the pressure recording unit. The connection consists of a base body wherein at least one end section of the pressure line is arranged, in addition to a pressure screw through which the pressure tube passes and is secured by a fixing element arranged on a side which is oriented towards the base body of the pressure screw. Said pressure screw has a thread which enables it to be screwed onto base body in such a way that the pressure tube and the pressure line are connected, and the connection is effectively sealed between the pressure tube and the pressure line.

10 Claims, 5 Drawing Sheets

PRESSURE MEASURING ARRANGEMENT

FIELD OF THE INVENTION

The present invention relates to a pressure measuring arrangement with a pressure measuring cell and a pressure recording unit, in which in operation a pressure to be measured acts on the pressure recording unit and is converted into a pressure corresponding to the pressure to be measured, which converted pressure is delivered via a fluid-filled connection from the pressure recorder to the pressure measuring cell of the pressure measuring cell.

BACKGROUND OF THE INVENTION

Such pressure measuring arrangements are used if a pressure to be measured cannot be delivered directly to the pressure measuring cell. This is the case for instance whenever the pressure measuring cell is very vulnerable to chemical and/or mechanical stresses, as is the case for instance with piezoresistive pressure measuring cells that for instance have measuring membranes comprising or having vulnerable semiconductor components, or if a difference between two pressures that act at different locations is to be detected with a measuring cell embodied as a differential-pressure measuring cell. Such pressure measuring arrangements are also used if a ceramic pressure measuring cell is to be used and if, for instance for hygienic reasons, a flush closure off from the process at the front is desired. These pressure measuring arrangements must be filled, once their manufacture is concluded, with a fluid that transmits the pressure corresponding to the pressure to be measured. To that end, the measuring arrangement is evacuated, for instance, and placed in a bath with the fluid and flooded. The fill openings are then closed, and the measuring arrangement can be connected to a site where it will be used.

Since the filling is comparatively complicated and requires special operating media, a measuring arrangement once completed is as a rule no longer changed.

For the sake of great flexibility with a view to measuring arrangements that can be furnished quickly, examples being various possible combinations of different pressure measuring cells with different pressure measurement recorders, or different oil supplies or pressure lines of different lengths, without having to keep all possible variants of pressure measuring arrangements on hand in adequate numbers, it is therefore desirable for such a pressure measuring arrangement to be embodied in modular fashion and then put together and filled as needed.

U.S Pat. No. 4,833,922 describes a differential-pressure measuring cell of modular construction, having: a pressure measuring cell, to which a pressure corresponding to a pressure to be measured is delivered via a fluid-filled pressure tube; at least one pressure recording unit, on which in operation a pressure to be measured acts, and which makes a pressure corresponding to the pressure to be measured available via a fluid-filled pressure line; and a connection between the pressure tube and the pressure line.

The differential-pressure measuring cell is very compactly designed. To that end, the pressure measuring cell is disposed directly in the pressure recording unit, and the pressure tubes are introduced into bores of the pressure recorder that form pressure lines. Frustoconical sealing elements are provided, which annularly surround the pressure tubes and are introduced into recesses of the same shape in the pressure recorder. A fastening is provided that presses the sealing elements inward into the recesses of the same shape. The fastening surrounds the pressure tubes annularly and is screwed onto the pressure recorded, for instance by means of tension bolts.

Such a compact design is not always usable. For instance, space conditions at the usage site, high temperatures acting on the pressure recorder, or pressure measuring cells that require a special mode of installation, for instance in a manner that is as free from fastening as possible, necessitate a spatial separation of the pressure measuring cell and the pressure recorder.

SUMMARY OF THE INVENTION

It is an object of the invention to provide a pressure measuring arrangement which is of modular construction and has a high degree of flexibility in terms of the three-dimensional disposition of the pressure measuring cell and the pressure recorder relative to one another.

To this end, the present invention comprises a pressure measuring arrangement, having:
- a pressure measuring cell; to which a pressure corresponding to a pressure to be measured is delivered via a fluid-filled pressure tube;
- at least one pressure recording unit disposed separately therefrom, on which in operation a pressure to be measured acts, and which makes a pressure corresponding to the pressure to be measured available via a fluid-filled pressure line; and
- a connection between the pressure tube and the pressure line, which connection includes:
- a base body, in which at least one end portion of the pressure line is disposed,
- a pressure screw, through which screw the pressure tube is passed and is secured there by means of a mount disposed on a side of the pressure screw oriented toward the base body, and which screw has a thread by means of which it is screwed onto the base body, in such a way that the pressure tube and the pressure line communicate, and sealing of die connection between the pressure tube and the pressure line is effective.

The present invention also comprises a pressure measuring arrangement, having:
- a pressure measuring cell; to which a pressure corresponding to a pressure to be measured is delivered via a fluid-filled pressure tube;
- at least one pressure recording unit disposed separately therefrom, on which in operation a pressure to be measured acts, and which makes a pressure corresponding to the pressure to be measured available via a fluid-filled pressure line; and
- a connection between the pressure tube and the pressure line, which connection includes:
- a base body, in which at least one end portion of the pressure line is disposed;
- a pressure screw, through which screw the pressure line is passed and is secured there by means of a mount disposed on a side of the pressure screw oriented toward the base body, and which screw has a thread by means of which it is screwed onto the base body, in such a way that the pressure tube and the pressure line communicate, and sealing of the connection between the pressure tube and the pressure line is effective.

In a first embodiment, the thread is a male thread, which is screwed into a recess in the base body. The pressure line or the pressure tube leads to the recess, and the mount is a ring mechanically solidly connected to the pressure tube or to the pressure line, which in the mounted state rests sealingly, with an end face oriented toward the pressure screw, on an end face of the pressure screw oriented toward the base body.

In a further feature, the pressure tube tapers conically on the outward end, and rests sealingly on a conical inside face of the same shape in the region of the orifice of the pressure line.

In a second embodiment, the pressure screw is a union nut, which takes the form of a cylinder closed on one end by a radially inward-extending shoulder. The cylinder has a female thread, which is screwed onto a male thread of the base body; and the pressure tube is passed through the shoulder into the pressure screw.

In a first feature of the second embodiment, the pressure line discharges into the base body and is connected tightly and mechanically solidly to it; the pressure tube is connected tightly and mechanically solidly to an annular disk coaxially surrounding the pressure tube; an end face of the annular disk rests on an annular-disklike inside face of the shoulder; and the annular disk is pressed by the pressure screw in the direction toward the base body.

In a feature of this last embodiment, between the annular disk and the base body, a sealing element annularly surrounding the pressure tube is provided, by which a hollow chamber, defined by the annular disk, the sealing element, and the base body, and surrounding the pressure tube is sealed off.

In a second feature of the second embodiment, the pressure tube is widened by crimping in the interior of the is pressure screw; the pressure line is introduced into the pressure tube; the pressure line is passed through the base body and mechanically solidly connected to it; the pressure line tapers conically on the outward end; and a crimped-on end portion of the pressure tube is fastened sealingly between a conical jacket face, disposed in the interior of the pressure screw, and the conical portion of the pressure line, in that the jacket face is pressed against the pressure line by the pressure screw in the direction toward the base body.

In a third feature of the second embodiment, a clamping cone is disposed on the end in the pressure screw, which clamping cone has an outer jacket face that tapers conically in the direction toward the base body, which jacket face grips the pressure tube and in which the pressure tube is fastened, in that the clamping cone is pressed inward with its conical jacket face by the pressure screw into an inner jacket face of the base body that is oriented toward the clamping cone and tapers conically in the direction remote from the clamping cone.

In a further feature of this last embodiment, on an end of the base body opposite the pressure screw, a second pressure screw of identical form is provided, through the pressure line is introduced into a bore penetrating the base body, in which bore a second clamping cone is disposed on the end, which clamping cone has an outer jacket face tapering conically in the direction toward the base body, which jacket face grips the pressure line and in which the pressure line is fastened, in that the second clamping cone is pressed inward with its conical jacket face by the second pressure screw into an inner jacket face of the base body oriented toward the second clamping cone and tapering conically in the direction remote from the clamping cone.

The present invention and further advantages will now be described in further detail in conjunction with the drawings, in which seven exemplary embodiments are shown. Identical elements are identified in the drawings by the same reference numerals.

DESCRIPTION OF THE PREFERRED EMBODIMENTS

Figure 1:
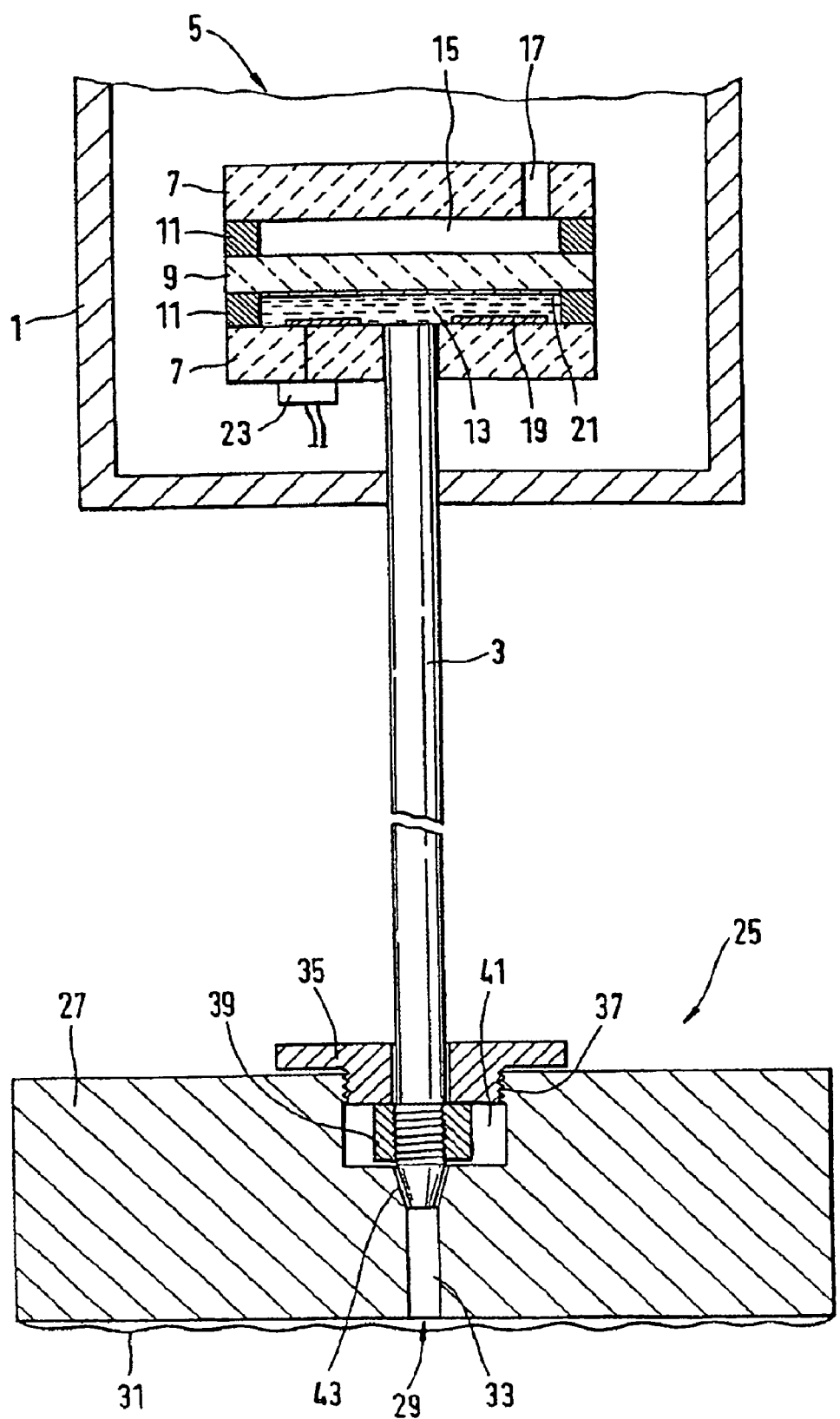
FIG. 1 shows a section through a pressure measuring arrangement of the invention, in which a pressure measuring cell is disposed in a housing disposed separately from a pressure recorder, and a pressure tube on the pressure recorder communicates with a pressure line of the pressure recorder.

FIG. 1 shows a section through a pressure measuring arrangement of the invention. It has a capacitive ceramic pressure measuring cell, in this case a relative-pressure measuring cell, that is soldered onto a pressure tube 3 in a manner free from fastening in a housing 1.

The pressure measuring cell 5 includes two ceramic base bodies 7, between which a membrane 9 is disposed. The membrane 9 is connected by means of two annular joining points 11 to the base bodies 7, forming a first and a second chamber 13, 15. The first chamber 13 communicates with the pressure tube 3 via a bore in the base body 7. In the exemplary embodiment shown, the pressure tube 3 is soldered into the bore in the base body 7. By way of the pressure tube 3, the pressure measuring cell 5 is supplied with a pressure corresponding to a pressure to be measured.

To that end, the first chamber 13 and the pressure tube 3 are filled with a substantially incompressible fluid, such as a silicone oil, that is acted upon by that pressure.

The second chamber 15 is opened relative to an interior of the housing 1 of the pressure measuring cell 5 via a bore 17 that passes continuously through the base body adjoining this second chamber. A deflection of the membrane 9 is thus dependent on the pressure corresponding to the pressure to be measured, which is referred to the ambient pressure operative in the interior of the housing. The deflection of the membrane is detected by a capacitor, which is disposed in the first chamber 13 and which has both a measuring electrode 19, disposed on a bottom face of the base body 7 toward the membrane, and a counter-electrode 21 applied to the membrane 9 facing the measuring electrode. The measuring electrode 19, for detecting the instantaneous capacitance, is connected via a through-connection through the base body 7 to an electronic circuit 23, which converts the capacitance into an electrical output signal and makes it available for further processing and/or evaluation via connecting lines.

At least one pressure recording unit 25 is disposed separately from the housing 1 and from the pressure measuring cell 5. In the exemplary embodiment shown, only one pressure recording unit 25 is provided. If instead of the relative-pressure measuring cell shown a differential-pressure measuring cell were provided, then it would be understood that there would be two pressure recording units, each connected to one pressure tube via a respective pressure line. A differential-pressure measuring cell of this kind could for instance be constructed similarly to the ceramic relative-pressure measuring cell described. From the relative-pressure measuring cell described, a differential-pressure measuring cell is obtained by introducing a second pressure tube into the open bore, shown in FIG. 1, of the second chamber 15, which second pressure tube is connected to a second pressure line of a second pressure recorder. The pressure transmission from the second pressure recorder into the associated chamber is effected via a fluid, with which the pressure recorder, the second pressure line, the second pressure tube, and the chamber are filled.

The pressure recording unit 25 shown in FIG. 1 has a base body 27 and a partitioning membrane 31, secured on the front, enclosing a chamber 29, to it by its outer edge. In operation, the pressure to be measured acts on the partitioning membrane 31 of the pressure recording unit 25. The base body 27 and the partitioning membrane 31 comprise a metal, such as a special steel.

The base body 27 has a continuous bore, one end of which discharges into the chamber 29. The bore forms a pressure line 33 and, just like the chamber 29, is filled with a substantially incompressible fluid, such as a silicone oil. A pressure to be measured, which in operation is exerted on the outside of the partitioning membrane 31, is converted in the chamber 29 into a pressure corresponding to it; the fluid is at this latter pressure and that pressure is available via the fluid-filled pressure line 33.

A connection is provided between the pressure tube 3 and the pressure line 33. The connection includes the base body 27, in which at least an end portion of the pressure line 33 is disposed. In the exemplary embodiment shown, the entire pressure line 33 is disposed in the base body 27.

The connection further includes a pressure screw 35, through which the pressure tube 3 is passed. On a side of the pressure screw 35 toward the base body, a mount 39 is provided, by which the pressure tube 3 is secured. In the exemplary embodiment shown, the mount 39 is a ring, which is mechanically solidly connected to the pressure tube 3 and which in the mounted state rests, with an end face toward the pressure screw 35, on an end face of the pressure screw 35 oriented toward the base body. In the exemplary embodiment shown, the mechanical fastening is realized by a male thread, formed onto the pressure tube 3, onto which the mount 39 is screwed. The position of the male thread determines how far the pressure tube 3 protrudes out of the pressure screw 35 and out of the mount 39. It is understood that still other mechanically solid connections that prevent a motion of the pressure tube 3 in the direction remote from the base body can also be used. For instance, the pressure tube 3 can be soldered into the mount 39 or welded there.

The pressure screw 35 has a thread 37, by means of which it is screwed into the base body 27 in such a way that the pressure tube 3 and the pressure line 33 are in communication, and sealing between the pressure tube 3 and the pressure line 33 is effective.

In the exemplary embodiment shown in FIG. 1, the thread 37 is a male thread, which is screwed into a cylindrical recess 41 in the base body 27. If the pressure screw 35 has a clockwise thread, then the mount 39 is preferable secured with a counterclockwise thread, to preclude loosening of the mount 39 when the pressure screw 35 is being screwed in.

The pressure tube 3 comprises a metal, such as a special steel. The mount 39 preferably likewise comprises a metal. The pressure line 33 leads to the recess 41 and discharges there. The pressure tube 3 tapers conically on the outward end and rests sealingly on a conical inside face 43, of the same shape, of the base body 27 in the region of the orifice of the pressure line 33. The mount 39 is thus located in the interior of the recess 41, and the pressure tube 3 is pressed against the orifice of the pressure line 33 as a result of the screwing in of the pressure screw 35 and the resultant force exerted on the mount 39 in the direction toward the base body, so that the sealing of the connection between the pressure tube 3 and the pressure line 33 by the conical jacket faces pressed against one another is effective.

Figure 2:
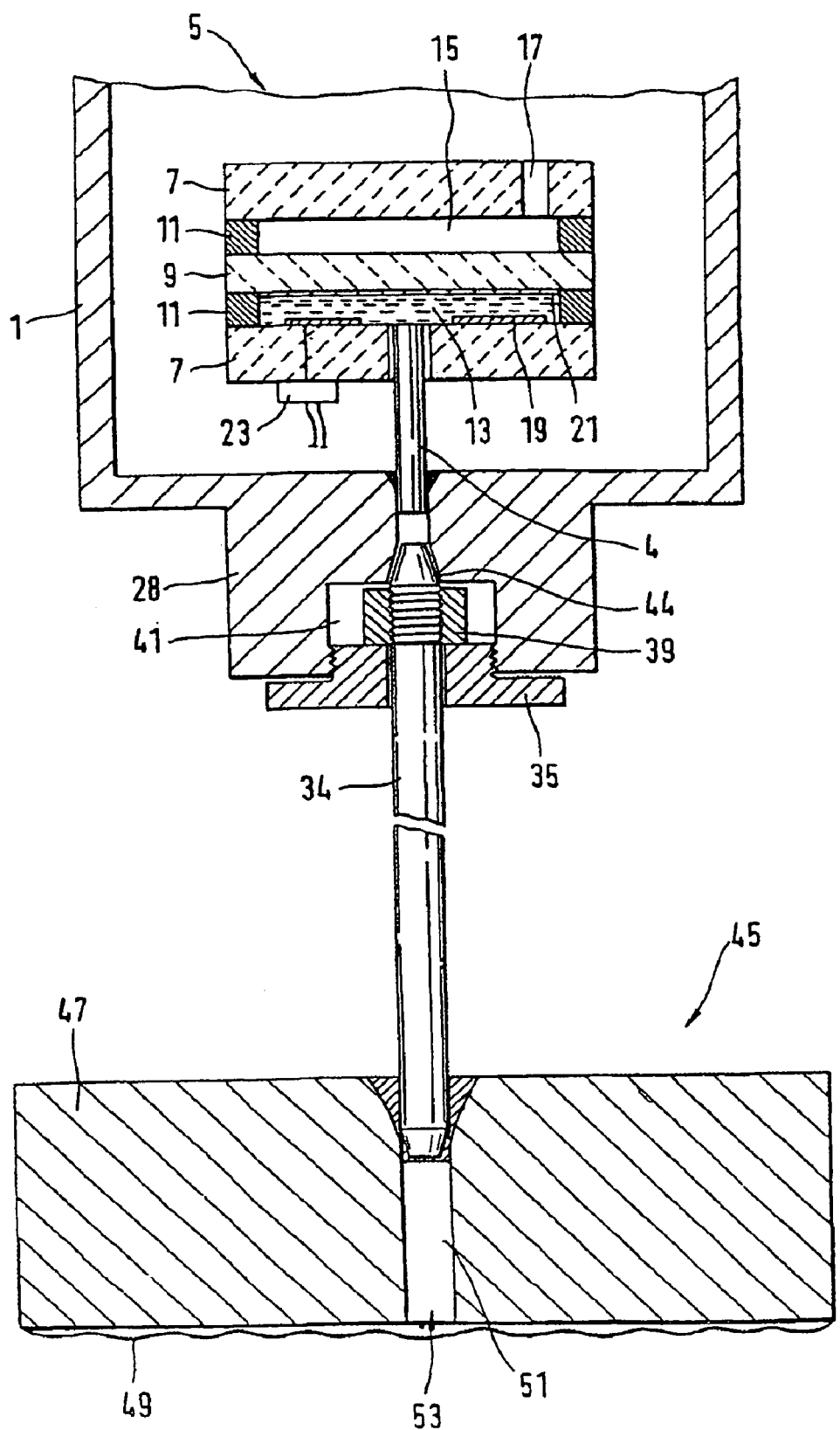
FIG. 2 shows a section through a pressure measuring arrangement of the invention, in which a pressure measuring cell is disposed in a housing disposed separately from a pressure recorder, and a pressure line on the housing communicates with a pressure tube of the pressure measuring arrangement.

FIG. 2 shows an exemplary embodiment that substantially agrees with the exemplary embodiment shown in FIG. 1. Unlike the exemplary embodiment shown in FIG. 1, however, the connection is not made directly at the pressure recorder 45 but instead near the pressure measuring cell 5. For that purpose, the housing 1 in the region of the exit point of the pressure line 4 has a base body 28 formed onto it. The pressure tube 4 is soldered into a bore that penetrates the base body 28 and discharges there. Hence at least one end portion of the pressure tube 4 is disposed in the base body 28. Analogously to the exemplary embodiment shown in FIG. 1, the base body 28 has a recess 41, into which the pressure screw 35 is screwed. A pressure line 34 is provided, which leads from the pressure recorder 25 to the base body 28, where it protrudes through the pressure screw 35 into the recess 41. Just as in the exemplary embodiment shown in FIG. 1, an identically embodied mount 39 is provided here in the interior of the recess 41, and this mount secures the pressure line 34.

The sealing of the connection between the pressure line 34 and the pressure tube 4 is effected by providing the pressure line 34 with a conical outer jacket face on its end, which face is pressed into the recess 41 by the screwing in of the pressure screw 35 against an inner jacket face 44, of the same shape, of the base body 28 in the region of the orifice of the bore.

The pressure recorder 45 has a base body 47 and a partitioning membrane 49 and is embodied similarly to the pressure recorder shown in FIG. 1. The base body 47 has a continuous bore 51, which discharges into a chamber 53 enclosed between the base body 47 and the partitioning membrane 49. The pressure line 34 is welded or soldered into an end of the bore 51 remote from the chamber.

Figure 3:
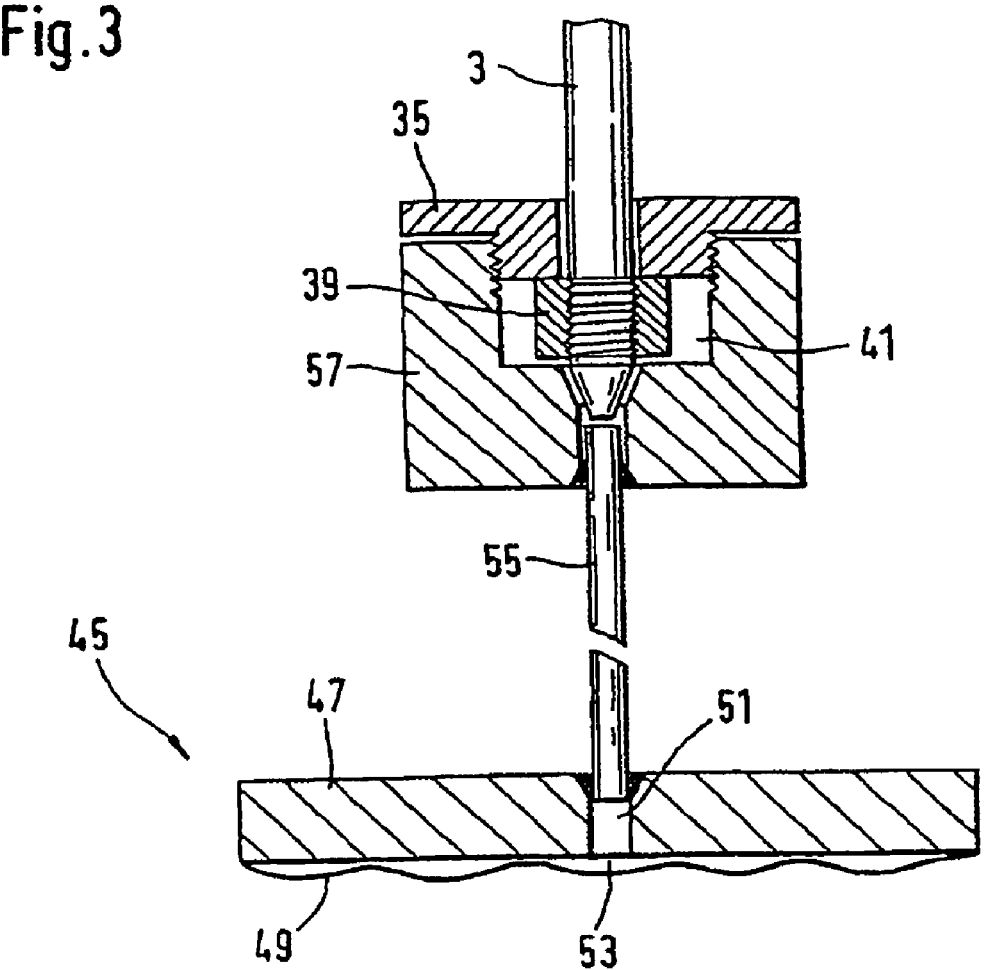
FIG. 3 shows a section through a connection according to the invention between a pressure tube and a pressure line, which is spaced apart from the pressure recorder and from the pressure measuring cell.

FIG. 3 shows a further exemplary embodiment, which is similar to both of the exemplary embodiments described above. A housing, not shown in FIG. 3, and a pressure measuring cell, also not shown, are, like the pressure line 3, are embodied similarly to the corresponding components in FIG. 1, and the pressure recorder 45 corresponds to that shown in FIG. 2. A pressure line 55 is welded or soldered into the bore 51 of the pressure recorder 45.

The pressure line 55 communicates with the pressure tube 3 that leads to the pressure measuring cell 5, not shown in FIG. 3. A connection spaced apart from the pressure recorder 45 and from the pressure measuring cell 5 exists between the pressure tube 3 and the pressure line 55, and it has a base body 57 in which an end portion of the pressure line 55 is disposed. The pressure line 55 and the base body 57 comprise a metal, such as a special steel. The base body 57 has a continuous bore, into which the pressure line 55 is for instance welded.

The connection of the pressure line 55 and the pressure tube 3 is effected analogously to the exemplary embodiment shown in FIG. 1, by means of a pressure screw 35, screwed into the recess 41 in the base body 57, and by means of a mount 39 and a conical jacket face of the pressure tube 3, which face is pressed by the pressure screw 35 against an identically shaped conical jacket face of the base body 57 in the region of the orifice of the pressure line 55, and so this connection is therefore not described again here.

Figure 4:
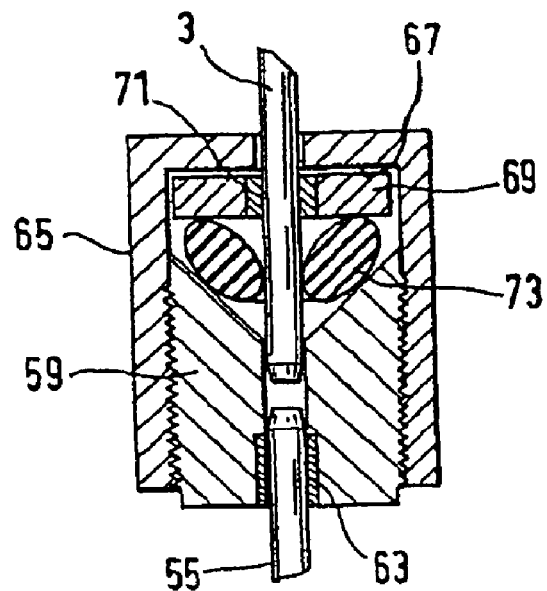
FIG. 4 shows a section through a further connection according to the invention between a pressure tube and a pressure line, which is spaced apart from the pressure recorder and from the pressure measuring cell.
Figure 5:
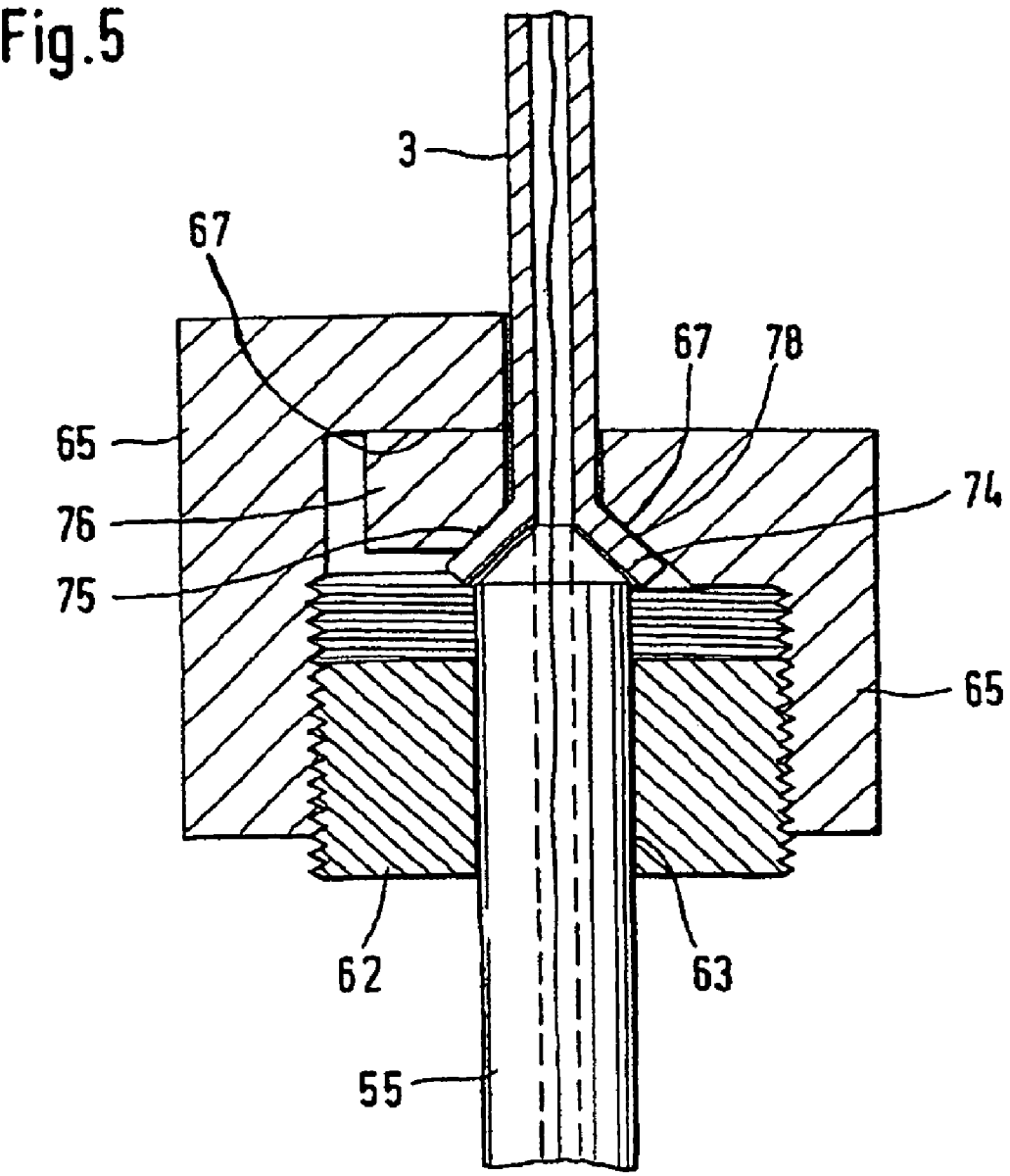
FIG. 5 shows a section through a further exemplary embodiment of a connection according to the invention between a pressure tube and a pressure line, in which a portion of the pressure tube crimped on at the end is used to fix the pressure tube, and sealing is effected by means of conically embodied jacket faces of the pressure tube and pressure line.

In FIGS. 4 and 5, two further embodiments of connections, spaced apart from the pressure recorder and from the pressure measuring cell, between the pressure tube 3 and the pressure line 55 are shown. The pressure measuring cell 5 connected to the pressure tube 3 and the pressure recorder 25 connected to the pressure line 55 are not shown in FIGS. 4 and 5. Examples of them can be taken identically from FIGS. 1 and 2.

In the embodiments shown in FIGS. 4 and 5, the connection in each case includes a respective essentially cylindrical base body 59, 62, with a central axial bore into which the pressure line 55 is introduced and is connected tightly and mechanically solidly by means of a soldered connection 63.

In each case, a pressure screw 65 is provided that coaxially surrounds the pressure tube 3. The pressure screws 65 are union nuts, which take the form of a cylinder closed at one end by a radially inward-extending shoulder 67. The cylinders have a female thread, which is screwed onto a male thread of the base body 59, 62. The pressure tubes 3 are passed through the shoulder 67 on into the union nut and secured by means of a mount disposed on a side, toward the base body, of the pressure screw 65.

The union nuts are screwed onto the base bodies 59, 62 in such a way that the pressure tube 3 and the pressure line 55 are in communication, and sealing of the connection between the pressure tube 3 and the pressure line 55 is effective. In the exemplary embodiment shown in FIG. 4, the mount comprises an annular disk 69, which coaxially surrounds the pressure tube 3 and is connected to it tightly and mechanically solidly, for instance by means of a soldered connection 71. The annular disk 69 is disposed inside the pressure screw 65 and rests with one end face on an annular-disklike inside face of the shoulder 67. The annular disk 69 is pressed against the base body 59 by the pressure screw 65.

The pressure tube 3 is introduced through the mount into the base body 59. The sealing of the connection is effected by a sealing element 73, disposed between the annular disk 69 and the base body 59 and annularly surrounding the pressure tube 3. By means of the sealing element 73, a hollow chamber, which is defined by the annular disk 69, sealing element 73 and base body 59, and which encloses the connection between the pressure tube 3 and the pressure line 55, is sealed off. The sealing element 73 in this exemplary embodiment is a ring of oval cross section, which rests on a conical end face of the base body 59. Other seal geometries are equally usable. It comprises a metal, such as copper. The pressure screw 65 and the base body 59 likewise comprise a metal, such as a special steel.

In the exemplary embodiment shown in FIG. 5, the pressure tube 3 is widened by crimping in the interior of the pressure screw 65.

The pressure line 55 is introduced through the base body 62 into the pressure tube 3 and is mechanically solidly connected to the base body by the soldered connection 63.

The pressure line 55 tapers conically on its outer end. The mount, by which the pressure tube 3 is secured in the interior of the pressure screw 65, essentially comprises the crimped-on portion 74 of the pressure tube 3 itself. This portion is fastened between a conical jacket face 75, 78, disposed in the interior of the pressure screw 65, and the conical portion of the pressure line 55, in that the jacket face 75, 78 is pressed against the pressure line 55 in the direction toward the base body by the pressure screw 65. By means of this fastening, the connection between the pressure tube 3 and the pressure line 55 is sealed off.

The jacket face 75, 78 is for instance, as shown on the right-hand side of FIG. 5, a conical jacket face 78 of the pressure screw 65 itself, or, as shown on the left-hand side of FIG. 5, a conical jacket face 75 of an annular cylinder 76 disposed in the pressure screw 65.

Figure 6:
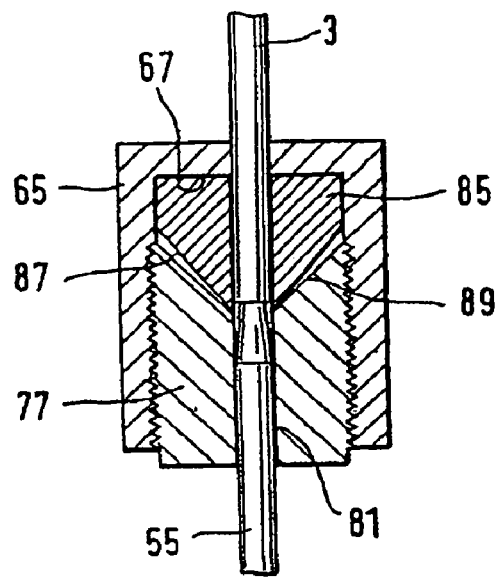
FIG. 6 shows a section through a clamping cone connection between a pressure line and a pressure tube.
Figure 7:
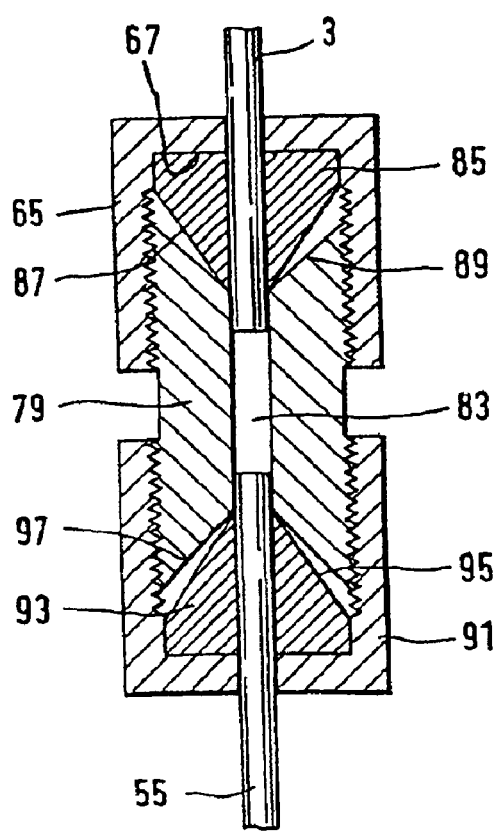
FIG. 7 shows a section through a connection between a pressure line and a pressure tube, in which the pressure line and the pressure tube are each connected to a base body by means of a respective clamping cone connection.

In FIGS. 6 and 7, two further embodiments of the connection between the pressure tube 3 and the pressure line 55 are shown. The pressure measuring cell 5 connected to the pressure tube and the pressure recorder 25 connected to the pressure line 55 are not shown here, either. Examples of them can be taken identically from FIGS. 1 and 2, for instance.

In the embodiments shown in FIGS. 6 and 7, the connection in each case includes a substantially cylindrical base body 77, 79 with a central axial bore 81, 83 into which the pressure line 55 is introduced.

In each case a pressure screw 65 is provided, which coaxially surrounds the pressure tube 3 and is embodied identically the pressure screws 65 shown in FIGS. 4 and 5. The pressure screws 65 are union nuts, which take the form of a cylinder closed on one end by the radially inward-extending shoulder 67. The cylinders have a female thread, which is screwed onto a male thread of the base body 77, 79. The pressure tubes 3 are passed through the shoulder 67 into the pressure screw 65 and are secured by means of a mount disposed on a side, toward the base body, of the pressure screw 65.

The pressure screws 65 are screwed onto the base bodies 77, 79 in such a way that the pressure tube 3 and the pressure line 55 communicate, and sealing of the connection between the pressure tube 3 and the pressure line 55 is effected.

In the exemplary embodiments shown in FIGS. 6 and 7, the sealing is effected by a clamping cone 85, which is disposed on the end in the pressure screw 65 and at the same time forms the mount for the pressure tube 3 passed through the clamping cone 85.

The clamping cone 85 grips the pressure tube 3 closely and rests with an annular-disklike end face on an inner face of the shoulder 67. It has an outer jacket face 87 that tapers conically in the direction toward the base body. The base bodies 77, 79 each have a respective inner jacket face 89 tapering conically in the direction remote from the clamping cone. The pressure tube 3 is fastened in the clamping cone 85 in that the clamping cone 85 is pressed with its conical jacket face by the pressure screw 65 into the inner jacket face 89 of the respective base body 77, 79, this latter jacket face tapering conically toward the clamping cone 85 in the direction remote from the clamping cone.

The conical outer jacket face 87 of the clamping cone 85 forms a more-acute angle with a longitudinal axis of the pressure tube 3 than does the inner jacket face 89 of the respective base body 77, 79. As a result, some of the force exerted in the axial direction on the clamping cone 85 by the pressure screw 65 is converted into a force that acts inward in the radial direction. This latter force causes a decrease in the inside diameter of the clamping cone 85 and thus leads to the tight, mechanically solid fastening of the pressure tube 3 in the clamping cone 85.

Once again, the base bodies 77, 79 and the pressure screws 65 comprise metal, such as a special steel. The clamping cone 85 preferably also comprises a metal. What is suitable is a material, such as copper, that is mechanically softer than the material comprising the base bodies 77, 79 and the pressure screws 65.

In the exemplary embodiment shown in FIG. 6, the pressure line 55 is connected mechanically solidly and tightly to the base body 77, for instance by being soldered into the bore 81.

In the exemplary embodiment shown in FIG. 7, only one end of the pressure line 55 is introduced into the bore 83, and the pressure line 55 is fastened in the same way as the pressure tube 3.

To that end, an identically shaped second pressure screw 91 is provided, on an end of the base body 79 facing the pressure screw 67, through which the pressure line 55 is introduced into the bore 83 that penetrates the base body 79. The second pressure screw 91 is screwed onto the base body 79. A second clamping cone 93 is disposed on the end in the second pressure screw 91 and has an outer jacket face 95 that tapers conically in the direction toward the base body. The second clamping cone 93 grips the pressure line 55. This pressure line is fastened in the clamping cone 93, in that the second pressure screw 91 presses the second clamping cone 93 with its conical jacket face 95 into an inner jacket face 97 of the base body 79 that tapers conically, toward the second clamping cone 93, in the direction remote from the clamping cone.

It is understood that the exemplary embodiments shown in FIGS. 3, 4, 5, 6 and 7 can also be embodied as a mirror image instead. The mirror-image form is obtained by simply converting the pressure tubes and pressure lines 55 and the pressure lines 55 into pressure tubes 3.

What is claimed is:

1. A pressure measuring arrangement, having:
    a pressure measuring cell, to which a pressure corresponding to a pressure to be measured is delivered via a fluid-filled pressure tube;
    at least one pressure recording unit disposed separately from said pressure measuring cell, on which in operation a pressure to be measured acts, and which makes a pressure corresponding to the pressure to be measured available via a fluid-filled pressure line; and
    a connection between the pressure tube and the pressure line, said connection includes:
    a base body, in which at least one end portion of the pressure line is disposed;
    a pressure screw, through which screw the pressure tube is passed and is secured there by means of a mount disposed on a side of the pressure screw oriented toward the base body, and said pressure screw has a thread by means of which it is screwed onto the base body, in such a way that the pressure tube and said pressure line communicate, and sealing of the connection between said pressure tube and said pressure line is effective.

2. A pressure measuring arrangement, having:
    a pressure measuring cell, to which a pressure corresponding to a pressure to be measured is delivered via a fluid-filled pressure tube;
    at least one pressure recording unit disposed separately from said pressure measuring cell, on which in operation a pressure to be measured acts, and which makes a pressure corresponding to the pressure to be measured available via a fluid-filled pressure line; and
    a connection between the pressure tube and said pressure line, said connection includes:
    a base body, in which at least one end portion of said pressure line is disposed;
    a pressure screw, through which said pressure tube is passed and is secured there by means of a mount disposed on a side of said pressure screw oriented toward said base body, and said pressure screw has a thread by means of which it is screwed onto said base body, in such a way that said pressure tube and said pressure line communicate, and sealing of the connection between said pressure tube and said pressure line is effective.

3. The pressure measuring arrangement of claim 2, wherein:
    said thread is a male thread, which is screwed into a recess in said base body;
    one of: said pressure line and said pressure tube leads to the recess; and
    said mount is a ring mechanically solidly connected to one of: said pressure tube and said pressure line, which in the mounted state rests sealingly, with an end face oriented toward said pressure screw, on an end face of said pressure screw oriented toward said base body.

4. The pressure measuring arrangement of claim 3, wherein:
    one of: said pressure tube and said pressure line tapers conically on the outward end, and rests sealingly on a conical inside face of the same shape in the region of the orifice of one of: said pressure line and said pressure tube.

5. The pressure measuring arrangement of claim 2, wherein:
    said pressure screw is a union nut, which takes the form of a cylinder closed on one end by a radially inward-extending shoulder; said cylinder has a female thread, which is screwed onto a male thread of the base body; and
    said pressure tube is passed through said inward-extending shoulder into the pressure screw.

6. The pressure measuring arrangement of claim 5, wherein:
    said pressure line discharges into said base body and is connected tightly and mechanically solidly to it;
    said pressure tube is connected tightly and mechanically solidly to an annular disk coaxially surrounding said pressure tube;
    an end face of said annular disk rests on an annular-disklike inside face of said inward-extending shoulder; and
    said annular disk is pressed by said pressure screw in said direction toward said base body.

7. The pressure measuring arrangement of claim 6, wherein:

between said annular disk and said base body, a sealing element annularly surrounding said pressure tube is provided, by which a hollow chamber, defined by said annular disk, said sealing element, and said base body, and surrounding said pressure tube is sealed off.

8. The pressure measuring arrangement of claim 5, wherein:

said pressure tube is widened by crimping in the interior of said pressure screw;

said pressure line is introduced into said pressure tube;

said pressure line is passed through said base body and mechanically solidly connected to it;

said pressure line tapers conically on said outward end; and a crimped-on end portion of said pressure tube is fastened sealingly between a conical jacket face, disposed in said interior of said pressure screw, and the conical portion of said pressure line, in that the jacket face is pressed against said pressure line by said pressure screw in the direction toward said base body.

9. The pressure measuring arrangement of claim 5, wherein:

a clamping cone is disposed on said end in said pressure screw, which clamping cone has an outer jacket face that tapers conically in said direction toward said base body, which jacket face grips said pressure tube and in which said pressure tube is fastened; and p1 said clamping cone is pressed inward with its conical jacket face by said pressure screw into an inner jacket face of said base body that is oriented toward said clamping cone and tapers conically in said direction remote from said clamping cone.

10. The pressure measuring arrangement of claim 9, wherein on an end of said base body facing said pressure screw, a second pressure screw of identical form is provided, through said pressure line and is introduced into a bore penetrating said base body, in which bore a second clamping cone is disposed on said end, which clamping cone has an outer jacket face tapering conically in the direction toward said base body;

said jacket face grips said pressure line in which the pressure line is fastened; and said second clamping cone is pressed inward with its conical jacket face by said second pressure screw into an inner jacket face of said base body oriented toward said second clamping cone and tapering conically in said direction remote from said clamping cone.

* * * * *